US012783696B2

(12) United States Patent
Peng et al.

(10) Patent No.: US 12,783,696 B2
(45) Date of Patent: Nov. 3, 2026

(54) SECURE TWO-PARTY REAL NUMBER COMPARISON METHOD AND APPARATUS BASED ON NONLINEAR MAPPING

(71) Applicant: Beihang University, Beijing (CN)

(72) Inventors: Shizhao Peng, Beijing (CN); Haogang Zhu, Beijing (CN); Shoumo Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 40 days.

(21) Appl. No.: 18/970,714

(22) Filed: Dec. 5, 2024

(65) Prior Publication Data

US 2026/0087150 A1 Mar. 26, 2026

(30) Foreign Application Priority Data

Sep. 26, 2024 (CN) ......................... 202411354419.7

(51) Int. Cl.
*G06F 21/60* (2013.01)
*G06F 7/544* (2006.01)
*G06F 17/16* (2006.01)

(52) U.S. Cl.
CPC .......... *G06F 21/602* (2013.01); *G06F 7/5443* (2013.01); *G06F 17/16* (2013.01)

(58) Field of Classification Search
CPC ............. H04L 2209/46; H04L 2209/04; H04L 9/085; G06F 17/16; G06F 17/10; G06F 7/5443
See application file for complete search history.

(56) References Cited

U.S. PATENT DOCUMENTS

2020/0304293 A1* 9/2020 Gama .................... G06F 17/147
2021/0201147 A1* 7/2021 Tu ............................ G06N 3/09
2023/0076256 A1* 3/2023 Wang .................... H04L 9/0643
2024/0313953 A1* 9/2024 Kreuter .................... H04L 9/085
2025/0038966 A1* 1/2025 Carr ........................ H04L 9/085

FOREIGN PATENT DOCUMENTS

WO WO-2025132478 A1 * 6/2025 ............. G06N 3/045

OTHER PUBLICATIONS

Notification of Grant of Patent Right for Invention for CN App. No. 202411354419.7, dated Aug. 14, 2025.

* cited by examiner

*Primary Examiner* — Tae K Kim
(74) *Attorney, Agent, or Firm* — Mark T. Vogelbacker; Eckert Seamans Cherin & Mellott, LLC

(57) ABSTRACT

A secure two-party real number comparison method and apparatus based on nonlinear mapping can include matching a secure two-party real number comparison protocol based on a real number comparison request, and executing the secure two-party real number comparison protocol on a first secure party real number and a second secure party real number based on a first secure party node and a second secure party node to obtain a first secure party computation result and a second secure party computation result, thereby obtaining a real number comparison result between the first secure party real number and the second secure party real number. The secure two-party real number comparison protocol is determined based on a secure two-party nonlinear mapping protocol and sign conversion processing; the secure two-party nonlinear mapping protocol is determined based on vector space mapping transformation and a secure two-party dot product protocol.

7 Claims, 6 Drawing Sheets

SECURE TWO-PARTY REAL NUMBER COMPARISON METHOD AND APPARATUS BASED ON NONLINEAR MAPPING

CROSS REFERENCE TO RELATED APPLICATION

This patent application claims the benefit and priority of Chinese Patent Application No. 202411354419.7, filed with the China National Intellectual Property Administration on Sep. 26, 2024, the disclosure of which is incorporated by reference herein in its entirety as part of the present application.

TECHNICAL FIELD

The present disclosure relates to the field of wireless communications, and in particular, to a secure two-party real number comparison method and apparatus based on nonlinear mapping.

BACKGROUND

With the continuous innovation and application of artificial intelligence and big data technologies, data has become an important strategic resource. In the context of privacy data modeling under large model scenarios, data alignment operations often require privacy comparisons during the data preprocessing and cleaning process. The maximum pooling layer in the model training phase also involves numerical comparison issues. Additionally, in scenarios requiring multi-party data sorting, such as decision tree models and K-Nearest Neighbor (KNN) models, the prediction process is closely related to privacy comparison operations. However, there are several issues currently present in secure two-party numerical comparison:

(1) Existing solutions to the secure two-party numerical comparison often employ computational frameworks developed based on traditional basic cryptographic primitives such as homomorphic encryption, secret sharing, and garbled circuits. These methods depend on computations in ciphertext space with extremely high time and space complexity, leading to low practicality and insufficient computational efficiency. (2) The outputs of existing secure two-party numerical comparison protocols lack fairness and consistency. The computation results are typically obtained by one party first, which then informs the other party of the comparison result. This model has a constraint issue where the output heavily relies on the trustworthiness of one party. If the party that receives the comparison result first exits the protocol early or broadcasts incorrect results, the final correct comparison result cannot be obtained. (3) Existing solutions to the secure two-party numerical comparison aim to verify whether the difference between two values to be compared is greater than zero, and protect this difference by introducing random obfuscation values. This results in excessive protection of the difference, leading to additional computational and memory overheads. (4) The application scenarios of existing secure two-party numerical comparison solutions often depend on outsourced cloud service systems. The low trustworthiness of third-party cloud service computing platforms or attacks from malicious nodes may lead to the leakage of intermediate computation results or key secret information, further posing security risks for the privacy of the original data party.

SUMMARY

An objective of the present disclosure is to provide a secure two-party real number comparison method and apparatus based on nonlinear mapping, which can achieve efficient, secure, and reliable privacy-preserving nonlinear numerical computation.

To achieve the above objective, the present disclosure provides the following technical solutions:

According to a first aspect, the present disclosure provides a secure two-party real number comparison method based on nonlinear mapping, including:

obtaining secure two-party real number comparison request information, where the secure two-party real number comparison request information includes a real number comparison request, a first secure party node and a corresponding first secure party real number, as well as a second secure party node and a corresponding second secure party real number;

matching a corresponding secure two-party real number comparison protocol based on the real number comparison request, and executing the secure two-party real number comparison protocol on the first secure party real number and the second secure party real number based on the first secure party node and the second secure party node to obtain a first secure party computation result and a second secure party computation result; and determining a real number comparison result between the first secure party real number and the second secure party real number based on the first secure party computation result and the second secure party computation result;

where the secure two-party real number comparison protocol is determined based on a secure two-party nonlinear mapping protocol and sign conversion processing; the secure two-party nonlinear mapping protocol is determined based on vector space mapping transformation and a secure two-party dot product protocol; and the secure two-party dot product protocol is determined based on random vectors, random numbers, an auxiliary computing node, and a secure data disguising technology.

According to a second aspect, the present disclosure provides a secure two-party real number comparison apparatus based on nonlinear mapping, including:

a task acquisition module, configured to analyze and obtain secure two-party real number comparison request information sent by a computing requester, where the secure two-party real number comparison request information includes a real number comparison request, a first secure party node and a corresponding first secure party real number, as well as a second secure party node and a corresponding second secure party real number;

a secure computation module configured to match a corresponding secure two-party real number comparison protocol based on the real number comparison request;

a comparison computation module configured to execute the secure two-party real number comparison protocol on the first secure party real number and the second secure party real number based on the first secure party node and the second secure party node to obtain a first secure party computation result and a second secure party computation result; and a data transmission module configured to return the first secure party computation result and the second secure party computation result to the computing requester, and determine, at the computing requester, a real number comparison result between the first secure party real number and the second secure party real number based on the first secure party computation result and the second secure party computation result;

where the secure two-party real number comparison protocol is determined based on a secure two-party nonlinear mapping protocol and symbol conversion processing; the secure two-party nonlinear mapping protocol is determined based on vector space mapping transformation and a secure two-party dot product protocol; and the secure two-party dot product protocol is determined based on random vectors, random numbers, an auxiliary computing node, and a secure data disguising technology.

According to the specific embodiments of the present disclosure, the present disclosure achieves the following technical effects: the present disclosure provides a secure two-party real number comparison method and apparatus based on nonlinear mapping. A secure two-party real number comparison protocol matching a real number comparison request is determined, and the secure two-party real number comparison protocol is then executed on the first secure party real number and the second secure party real number based on the first secure party node and the second secure party node to obtain a first secure party computation result and a second secure party computation result, thereby obtaining a real number comparison result. It should be noted that the secure two-party real number comparison protocol plays an important role in this process, and the secure two-party real number comparison protocol is determined based on the secure two-party nonlinear mapping protocol and sign conversion processing. By invoking the secure two-party nonlinear mapping protocol and sign conversion, privacy protection and fair output of the comparison results for both parties are achieved at the lowest computational cost. The secure two-party nonlinear mapping protocol is determined based on vector space mapping transformation and the secure two-party dot product protocol. By invoking the secure two-party dot product protocol, respective nonlinear mapping values corresponding to the inputs are calculated, addressing the issues of high complexity, large communication overheads, and low usability of ciphertext computations in the existing solutions based on homomorphic encryption, secret sharing, and garbled circuits. This results in an efficient and secure two-party numerical comparison scheme that does not rely on third-party cloud service platforms. The secure two-party dot product protocol is determined based on random vectors, random numbers, an auxiliary computing node, and a secure data disguising technology. The setup of the secure two-party dot product protocol is derived from the principles of the secure data disguising technology. The secure two-party dot product protocol does not require the introduction of any keys, and due to its inherent characteristics of disguising encrypted data in the real number domain, it ensures "one-time pad" security while also reducing the computational costs.

BRIEF DESCRIPTION OF THE DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

Figure 1:
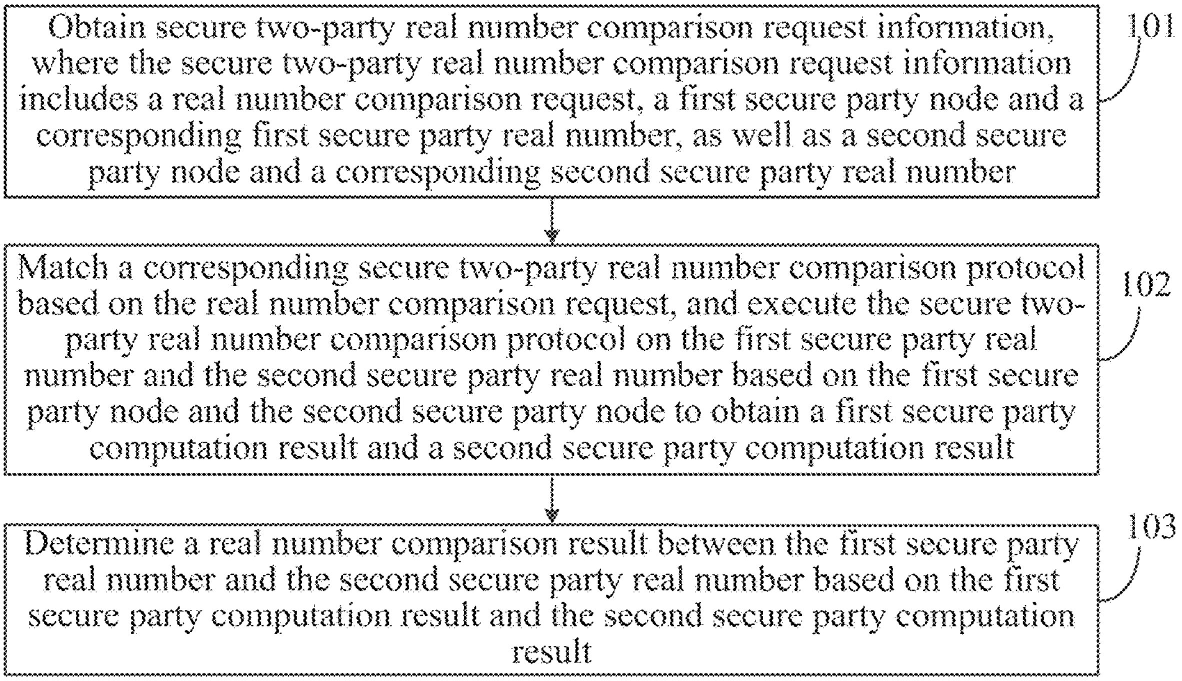
FIG. 1 is a schematic flowchart of a secure two-party real number comparison method based on nonlinear mapping according to an embodiment of the present disclosure.

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

The following are explanations of some terms that appear in the present disclosure:

Semi-honest adversaries security is a specific protocol assuming that all computing participants honestly perform privacy-preserving computation and perform each procedure in strict accordance with the protocol, but there are some risks caused by a corrupt participant who attempts to infer privacy of another participant based on an intermediate or final result obtained in a protocol execution process.

Secure 2-Party Dot Product Protocol (S2PDP) assumes that there are two mutually distrustful participants, P1 and P2; the two participants hold secret input vectors x and y, respectively, and jointly execute a two-party dot product protocol $f(x,y)=\mathrm{Output}(v_1,v_2)=x\odot y$, where the participants ultimately obtain the corresponding outputs $v_1$, $v_2$, and the outputs satisfy $v_1+v_2=x\odot y$. Throughout the entire computation process, each participant node only has knowledge of the input and output data involved in its own computation flow and cannot access any intermediate computation results of the other participant node.

Secure 2-Party Comparison Protocol (S2PC) assumes that there are two mutually distrustful participants, P1 and P2; the two participants hold secret real numbers x and y, respectively, as inputs, and jointly execute a two-party comparison protocol $f(x,y)\mapsto(U_a,U_b)$, where $U_a=U_b=$Sign (S)=Output{−1,0,1}. Ultimately, each participant learns the relative sizes of the two real numbers, where "−1" represents x<y, "0" represents x=y, and "1" represents x>y. Throughout the entire computation process, each participant node only has knowledge of the input and output data involved in its own computation flow and cannot access any intermediate computation results of the other participant node.

Non-Linear Mapping specifically refers to a family of unary monotonic functions formed by coupling an (n+1)-dimensional parameter vector $\theta=\{(\theta_0, \theta_1, \theta_2, \ldots, \theta_n)|(\theta_i \in R^+, i=1-n)\}$ defined in the positive real number domain with a random element function from a set of odd power functions $\mathcal{H}=\{(x, x^3, x^5, \ldots, x^m)|(m=2i-1, i\geq 1)\}$. The function can be formalized as $$\mathcal{F}(x, \theta) = \theta_0 + \sum_{i=1}^{n} \theta_i \cdot f_i(x) = \theta \odot F(x),$$

where $f_i(x) \in \mathcal{H}$ is any power function randomly selected from the set $\mathcal{H}$, and the function vector is $F(x)=(1, f_1(x), f_2(x), \ldots, f_n(x))$.

Secure Data Disguising Technology (SDDT) is a data protection method used to safeguard intermediate results in multi-party secure computations. By reasonably constructing computation protocols, it randomly splits the computation results, allowing outputs of multiple parties to collectively form a true target computation result through linear combination, ultimately achieving a one-time pad data privacy protection effect.

Privacy-Preserving Computing Technology specifically refers to a series of information security technologies that enable collaborative multi-party computation without exposing the private data of each party. This breaks down data silos and allows for complex computation and modeling analysis of multi-source data, ensuring that data elements are "available but invisible" during the circulation and integration process.

To make the objectives, features, and advantages of the present disclosure more obvious and easy to understand, the present disclosure will be further described in detail with reference to the accompanying drawings and specific implementations.

In an exemplary embodiment, as shown in FIG. 1, a secure two-party real number comparison method based on nonlinear mapping is provided. The method is executed by a computer device. Specifically, the method can be executed independently by a computer device such as a terminal or a server, or executed jointly by a terminal and a server. In this embodiment of the present disclosure, the secure two-party real number comparison method based on nonlinear mapping includes step 101 to step 103 as follows Step 101: Obtain secure two-party real number comparison request information, where the secure two-party real number comparison request information includes a real number comparison request, a first secure party node and a corresponding first secure party real number, as well as a second secure party node and a corresponding second secure party real number.

Step 102: Match a corresponding secure two-party real number comparison protocol based on the real number comparison request, and execute the secure two-party real number comparison protocol on the first secure party real number and the second secure party real number based on the first secure party node and the second secure party node to obtain a first secure party computation result and a second secure party computation result.

Step 103: Determine a real number comparison result between the first secure party real number and the second secure party real number based on the first secure party computation result and the second secure party computation result.

The secure two-party real number comparison protocol is determined based on a secure two-party nonlinear mapping protocol and sign conversion processing; the secure two-party nonlinear mapping protocol is determined based on vector space mapping transformation and a secure two-party dot product protocol; and the secure two-party dot product protocol is determined based on random vectors, random numbers, an auxiliary computing node, and a secure data disguising technology.

To visually demonstrate the algorithm flow of the secure two-party real number comparison protocol, the following content will derive and describe the secure data disguising technology, secure two-party dot product protocol, secure two-party nonlinear mapping protocol, and secure two-party real number comparison protocol in sequence. Additionally, in the following text, the first secure party node may be represented as node Alice, and the second secure party node may be represented as node Bob.

(1) Secure Data Disguising Technology

In most cases, more than one procedure needs to be performed to ensure secure computation in a multi-party computation process. Therefore, how to ensure security of an intermediate result during interaction is an inevitable problem. For example, when a product A×B of two-party matrices is used as an intermediate computation result, regardless of whether the participant node Alice or node Bob obtains a result of a final matrix A×B, data information of the other node may possibly be deduced reversely. Therefore, not only security of initial input data but also security of an intermediate computation result should be ensured during the privacy-preserving computation process.

Figure 2:
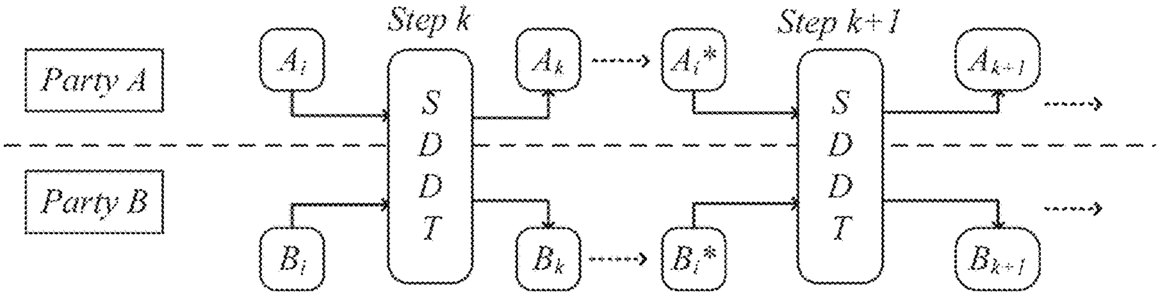
FIG. 2 is a principle diagram of a secure data disguising technology according to an embodiment of the present disclosure.

In order to solve this problem, a secure data disguising and encryption technology that decomposes an arbitrary multi-item operation into a new multi-item addition to obfuscate intermediate computation results is applied in the present disclosure. Taking the two-party operation type as an example, the principle of the secure data disguising technology is illustrated in FIG. 2. It is assumed that $S_k=F_k(A_i, B_i)$, where $F_k$ is a target computation function for the k-th step, $A_i$ is private input data belonging to node Alice for the k-th step, and $B_i$ is private input data belonging to node Bob for the k-th step. During the execution of the k-th step of the multi-party secure computation protocol, the intermediate result $S_k$ will strictly adhere to the following constraints: Alice only knows her own computation result $A_k$ and Bob only knows his own computation result $B_k$, and $A_k+B_k=S_k$. The formula $[A_i:B_i]\rightarrow[A_k:B_k|A_k+B_k=F_k(A_i,B_i)]$ represents the process of passing the intermediate value. Throughout this process, node Alice and node Bob are not allowed to exchange data information with each other, including $A_k$ and $B_k$ split from the intermediate result. Similarly, for the k+1-th step, the inputs $$A_i^* \text{ and } B_i^*$$

are constructed from the outputs $A_k$ and $B_k$ of node Alice and node Bob from the k-th step, where $$A_i^* = A_k \text{ and } B_i^* = B_k.$$

The outputs $A_{k+1}$ and $B_{k+1}$ satisfy $$S_{k+1} = F_{k+1}(A_i^*, B_i^*) = A_{k+1} + B_{k+1},$$

with node Alice only knowing her own computation result $A_{k+1}$ and node Bob only knowing his own result $B_{k+1}$. Therefore, as long as it is ensured that at each step of the computation, the intermediate values are split into two random data items stored separately in the two computing participants, it can be guaranteed that no party can infer the original data items from the disguised encrypted data, thus providing a high level of security for the entire privacy-preserving computation process.

Based on this, the present disclosure further provides the secure two-party dot product protocol.

(2) Secure Two-Party Dot Product Protocol

Figure 3:
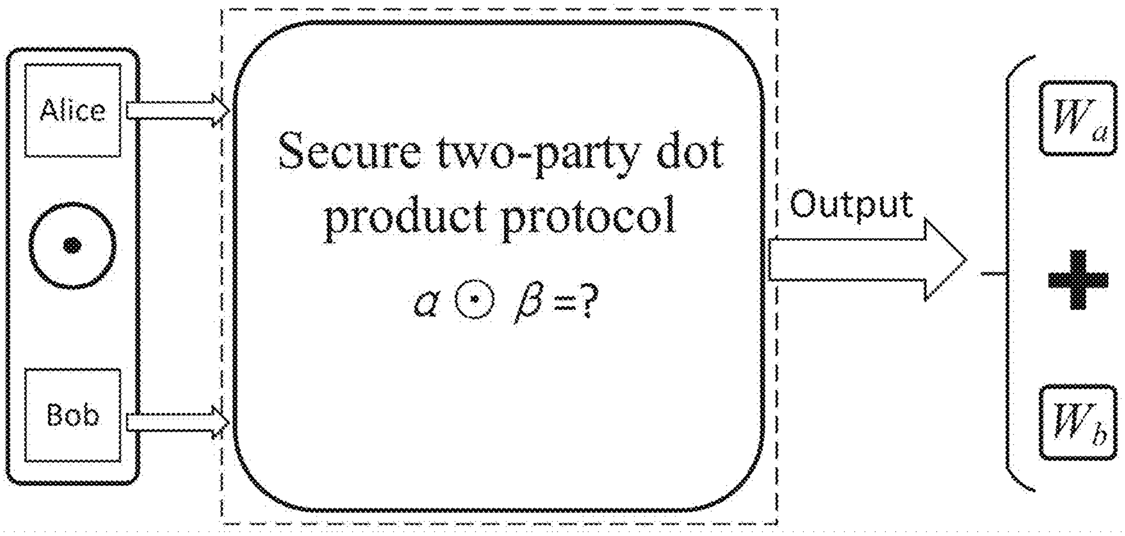
FIG. 3 is a schematic diagram of a secure two-party dot product problem according to an embodiment of the present disclosure.

Before determining the process of the secure two-party dot product protocol, it is necessary to define the problem: There are two computing parties or computing nodes, Alice and Bob, who are independent and mutually distrustful of each other. Node Alice holds an n-dimensional private vector $\alpha=(\alpha_1, \alpha_2, \ldots, \alpha_n)^T$, and node Bob holds an n-dimensional private vector $\beta=(\beta_1, \beta_2, \ldots, \beta_n)^T$. The two nodes wish to jointly execute a secure two-party vector dot product protocol to achieve $f_{S2PDP}(\alpha,\beta)=\alpha\odot\beta=W_a+W_b$, where the computing nodes ultimately obtains their corresponding outputs $W_a$ and $W_b$, which are sent to the computing requester to aggregate and obtain the desired two-party dot product result. During the computation process, each participant node can only obtain its own input/output information, and cannot access intermediate computation results and private data information of the other participant, specifically as shown in FIG. 3.

Figure 4:
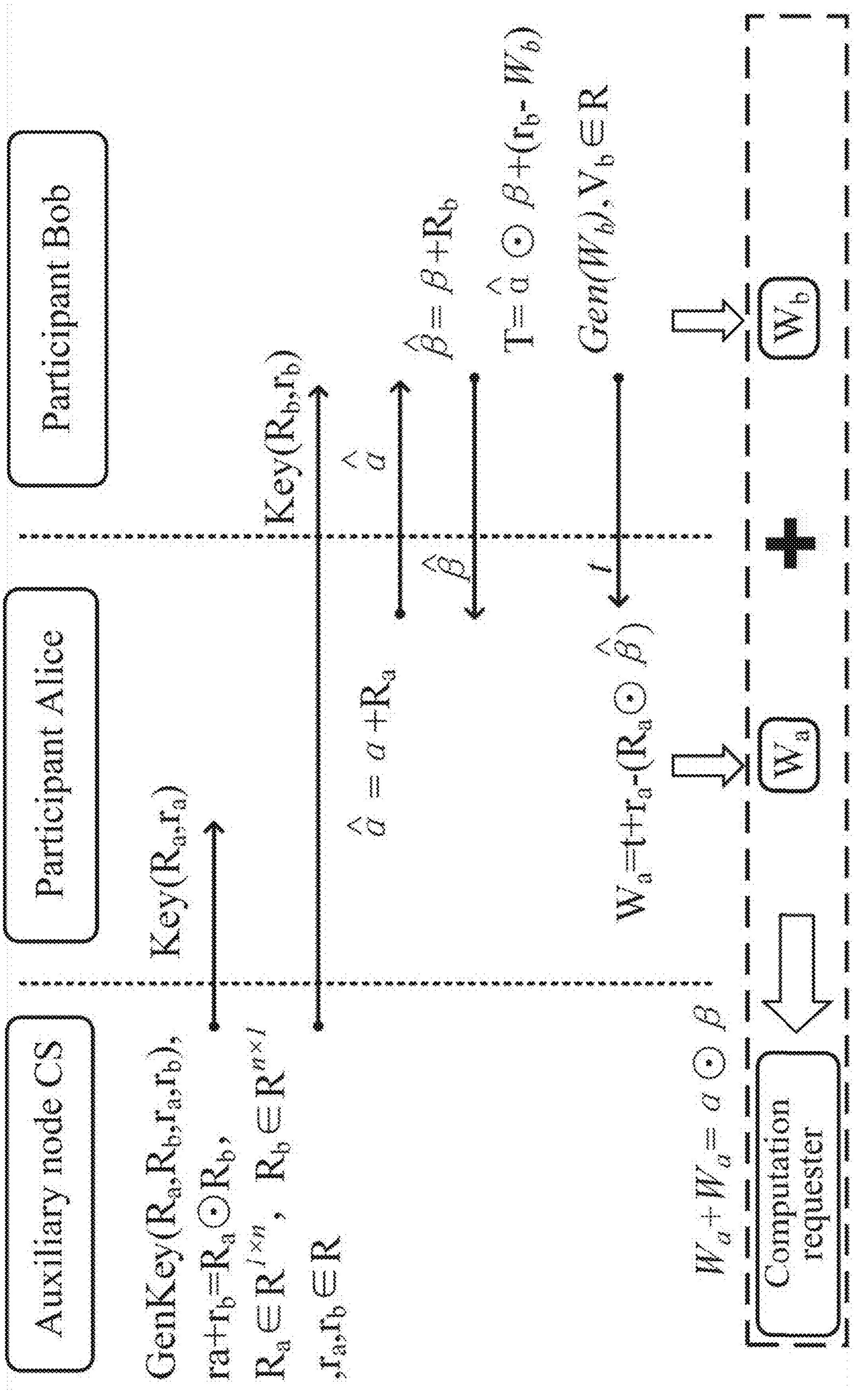
FIG. 4 is a flowchart of a secure two-party dot product computation protocol according to an embodiment of the present disclosure.

To address the above problem, as shown in FIG. 4, the secure two-party dot product protocol in the present disclosure includes:

(21) Obtain a first private vector generated at the first secure party node and a second private vector generated at the second secure party node, where when the first private vector is a first secure party private parameter vector, the corresponding second private vector is a second secure party private input vector; when the first private vector is a first secure party private input vector, the corresponding second private vector is a second secure party private parameter vector.

It should be noted that this step is only required when executing the secure two-party nonlinear mapping protocol. If only the secure two-party dot product protocol is invoked in practical applications, this step can be directly skipped, and the corresponding private vectors can be obtained as inputs.

(22) Invoke an auxiliary computing node (commodity server, also known as CS for short), and randomly generate a first random vector and a corresponding first random number, as well as a second random vector and a corresponding second random number at the auxiliary computing node, where a sum of the first random number and the second random number equals a dot product of the first random vector and the second random vector.

Specifically, the auxiliary computing node generates an n-dimensional first random vector $R_a$, an n-dimensional second random vector $R_b$, as well as a first random number $r_a$ and a second random number $r_b$. These random variables strictly satisfy the following constraint: $r_a+r_b=R_a$ G $R_b$.

(23) Send the first random vector $R_a$ and the first random number $r_a$ from the auxiliary computing node CS to the first secure party node Alice; and send the second random vector $R_b$ and the second random number $r_b$ from the auxiliary computing node CS to the second secure party node Bob.

(24) At the first secure party node Alice, determine a first encrypted vector $\hat{\alpha}$ based on the first random vector $R_a$ and the first private vector $\alpha$, with a specific calculation formula as follows: $\hat{\alpha}=\alpha+R_a$; then send the first encrypted vector $\hat{\alpha}$ to the second secure party node Bob; at the second secure party node Bob, randomly generate a second private output $W_b\in R$, and calculate an intermediate result t based on the second random number $r_b$, the second private output $W_b$, the first encrypted vector $\hat{\alpha}$, and the second private vector $\beta$, with a specific calculation formula as follows: $t=\hat{\alpha}\odot\beta+(r_b-W_b)$; then send the intermediate result t to the first secure party node Alice.

(25) At the second secure party node Bob, determine a second encrypted vector $\hat{\beta}$ based on the second random vector $R_b$ and the second private vector $\beta$, with a specific calculation formula as follows: $\hat{\beta}=\beta+R_b$; and then send the second encrypted vector $\hat{\beta}$ to the first secure party node Alice.

(26) At the first secure party node Alice, calculate a first private output $W_a$ based on the intermediate result t, the second encrypted vector $\hat{\beta}$, the first random number $r_a$, and the first random vector $R_a$, with a specific calculation formula as follows: $W_a=t+r_a-(R_a\odot\hat{\beta})$.

(27) Mark the second private output as a second dot product sub-result or a fourth dot product sub-result, and mark the first private output as a first dot product sub-result or a third dot product sub-result, where a sum of the first dot product sub-result and the second dot product equals a dot product of the first private vector $\alpha$ and the second private vector $\beta$, that is, $\alpha\odot\beta=W_a+W_b$.

In practical applications, if only the secure two-party dot product protocol is executed, the final disguised split results $W_a$ and $W_b$ can be sent to the computing requester, and are aggregated by the computing requester to obtain the final product. Additionally, verification can be performed within the computing requester: $W_a+W_b=[(\hat{\alpha}\odot\beta+(r_b-W_b))+r_a-(R_a\odot\hat{\beta})]+W_b=[(\alpha\odot\beta-W_b)+(r_a+r_b-R_a\odot R_b)]+W_b-\alpha\odot\beta$.

(3) Secure Two-Party Nonlinear Mapping Protocol.

Figure 5:
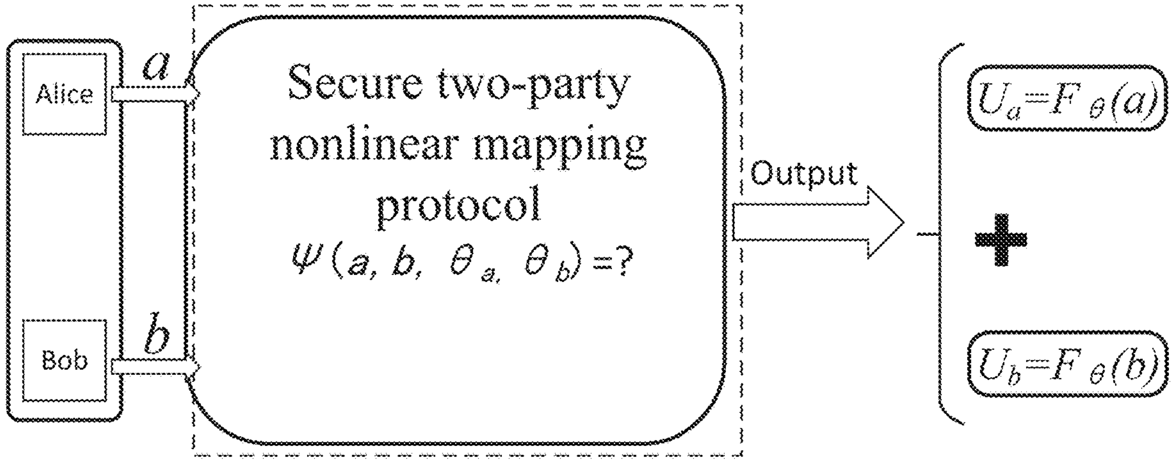
FIG. 5 is a schematic diagram of a secure two-party nonlinear mapping problem according to an embodiment of the present disclosure.

Before determining the process of the secure two-party nonlinear mapping protocol, it is necessary to define the problem: There are two computing participants, Alice and Bob, who are independent and mutually distrustful of each other. Alice holds private data $a\in R$ and a private parameter vector $\theta_a=(\theta_{a0}, \theta_{a1}, \theta_{a2}, \ldots, \theta_{an})\in R^+$ that are stored only at her own computing node. Bob holds private data $b\in R$ and a private parameter vector $\theta_b=(\theta_{b0}, \theta_{b1}, \theta_{b2}, \ldots, \theta_{bn})\in R^+$ that are stored only at his own computing node. The two computing participants, Alice and Bob, collaboratively compute the nonlinear mapping $$\mathcal{F}(x, \theta) = \theta_0 + \sum_{i=1}^{n} \theta_i \cdot f_i(x) = \theta \odot F(x)$$

to obtain corresponding function values $U_a=\mathcal{F}_\theta(a)$, $U_b=\mathcal{F}_\theta(b)$ when the private data satisfies x=a or b. The parameter $\theta$ in the nonlinear mapping $\mathcal{F}(x,\theta)$ is jointly constructed from the private parameter vectors $\theta_a$ and $\theta_b$ of both parties, satisfying the relationship $\theta=\theta_a+\theta_b$, while both parties keep their respective parameter vectors $\theta_a$ and $\theta_b$ confidential. Therefore, the problem can be equivalently stated as follows: both parties need to construct a two-party nonlinear mapping protocol $\psi(a,b,\theta_a,\theta_b)=\theta \odot F(x)=(U_a,U_b)$ under the premise of knowing the specific form of the function vector $F(x)=(1, f_1(x), f_2(x), \ldots, f_n(x))$ but not knowing the distribution of the parameter $\theta$, and collaboratively compute to obtain their corresponding mapping output results $U_a=\mathcal{F}(a)$, $U_b=\mathcal{F}(b)$, which are then sent to the computing requester. During the computation process, each participant node can only obtain its own input/output information, and cannot access intermediate computation results and final output of the other participant. The defined problem is illustrated in FIG. 5.

Based on the defined problem, the present disclosure proposes the following design principles:

First, for the nonlinear mapping, let $f_i(x) \in \mathcal{H}$ be any power function randomly selected from the set $\mathcal{H}$. This power function can also be replaced with a more general set of monotonically increasing functions. Therefore, the set $\mathcal{H}$ can be represented as monotonically increasing functions on the real number domain $\mathcal{H}=\{f(x) \mid \forall x \in R$, f(x) being differentiable, and $f'(x) \geq 0\}\}$. Since the first derivative $$\mathcal{F}_x'(x,\theta)=\sum_{i=1}^{n}\theta_i \cdot f_i'(x)$$

of the family of nonlinear mapping functions is composed of positive domain parameters $\theta_i$ and non-negative even power functions $f_i'=x^{2k}$, k=1, 2, . . . n, it is evident that $\mathcal{F}(x,\theta) \geq 0$ is always a monotonically increasing function. In practical applications, the parameter $\theta$ can be defined in the negative domain, and the power function set $\mathcal{H}$ can represent a family of monotonically decreasing functions in the real number domain, ensuring that the mapping still maintains its monotonicity.

To jointly compute the nonlinear mapping from the real number domain $R \mapsto R \mid \mathcal{F}(x,\theta)$ with two mutually distrustful participants, the participant Alice and the participant Bob need to obtain their corresponding mapping output values $\mathcal{F}(a)$ and $\mathcal{F}(b)$ without exposing their private data $\{a,\theta_a\}$ and $\{b,\theta_b\}$. To simplify the analysis, let $f_i(x)=x^{2i-1}$ in the present disclosure, and then the nonlinear mapping can be expressed as $\mathcal{F}(x,\theta)=\theta_0+\theta_1 x+\theta_2 x^3+ \ldots +\theta_{nx}{}^{2n-1}$. Furthermore, the nonlinear mapping can be transformed into a tensor space and represented as vector inner product computation $\mathcal{F}(x,\theta) \mapsto \Pi(\theta,X)=\theta \odot X$, where X is an (n+1)-dimensional vector $X=(1, x, x^3, \ldots, x^{2n-1})$ derived from the unary variable x.

According to the above problem definition, the participant Alice and the participant Bob hold private parameters of the nonlinear mapping, which are $\theta_a=(\theta_{a0}, \theta_{a1}, \theta_{a2}, \ldots, \theta_{an}) \in R^{n+1}$ and $\theta_b=(\theta_{b0}, \theta_{b1}, \theta_{b2}, \ldots, \theta_{bn}) \in R^{n+1}$, respectively, and the private parameters satisfy $\theta=\theta_a+\theta_b$. Therefore, the problem can be further transformed into $\mathcal{F}(x,\theta) \mapsto \Pi(\theta,X)=(\theta_a+\theta_b) \odot X=\theta_a \odot X+\theta_b \odot X$. Clearly, when the input variable x belongs to node Alice, the calculation process of the mapping function corresponding to node Alice can be expressed as $\mathcal{F}(x_a,\theta) \mapsto \Pi(\theta,X_a)=\theta_a \odot X_a+\theta_b \odot X_a=(\theta_a \odot X_a+V_{a1})+V_{b1}=V_a+V_b=U_a$. At this point, it is only necessary to invoke the secure two-party dot product (S2PDP) protocol once to obtain $f_{S2PDP}(X_a,\theta_b)=V_{a1}+V_{b1}$, and then send the output $V_b=V_{b1}$ to node Alice, who will aggregate the intermediate computation results $(V_a,V_b)$ of both parties to obtain the mapping value $x_a \mapsto U_a=\mathcal{F}(x_a)$ corresponding to $x_a$. Similarly, when the input variable x originates from node Bob, a similar derivation is performed: $\mathcal{F}(x_b,\theta) \mapsto \Pi(\theta,X_b)=\theta_a \odot X_b+\theta_b \odot X_b=V_{a2}+(\theta_b \odot X_b+V_{b2})=V_a'+V_b'=U_b$. At this point, it is also only necessary to invoke the S2PDP protocol once: $f_{S2PDP}(\theta_a,X_b)=V_{a2}+V_{b2}$, and then send the output $V_a'=V_{a2}$ to node Bob, who will aggregate the intermediate computation results $(V_a',V_b')$ of both parties to obtain the corresponding mapping value $x_b \mapsto U_b=\mathcal{F}(x_b)$.

Figure 6:
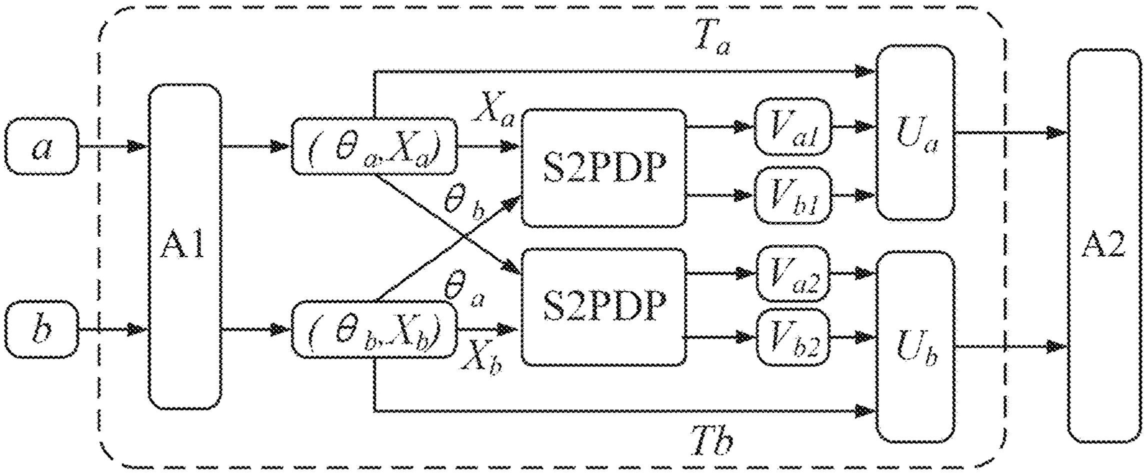
FIG. 6 is a flowchart of a secure two-party nonlinear mapping protocol according to an embodiment of the present disclosure; where A1 represents preprocessing module and A2 represents computing requester.

Corresponding to the above problem, as shown in FIG. 6, the process of the secure two-party nonlinear mapping protocol in the present disclosure includes:

(31) Obtain the first secure party node Alice and the corresponding first secure party real number a, as well as the second secure party node Bob and the corresponding second secure party real number b.

(32) At the first secure party node Alice, generate a first secure party private parameter vector and perform vector space mapping transformation based on the first secure party real number to generate a first secure party private input vector; at the second secure party node, generate a second secure party private parameter vector and perform vector space mapping transformation based on the second secure party real number to generate a second secure party private input vector. At this point, the processing within the preprocessing module in FIG. 6 is complete.

Taking the steps executed at the first secure party node Alice as an example, steps for determining the first secure party private parameter vector and the first secure party private input vector include:

(321) Obtain a random parameter n that is jointly negotiated and determined by the first secure party node Alice and the second secure party node Bob, where in an application instance, n is a positive integer, n 2.

(322) At the first secure party node Alice, generate a set of $(|n|+1)$-dimensional parameter vectors $\theta_a=(\theta_{a0}, \theta_{a1}, \theta_{a2}, \ldots, \theta_{an}) \in R^+$ based on the random parameter, which are labeled as the first secure party private parameter vector.

(323) At the first secure party node Alice, perform a mapping transformation from unary real numbers to an $(|n|+1)$-dimensional vector space: $x \mapsto X=(1, x, x^3, \ldots, x^{2n-1})$, based on the first secure party real number a, to obtain the first secure party private input vector $X_a=(1, a, a^3, \ldots, a^{2n-1})$.

Steps executed at the second secure party node Bob are similar and will not be repeated here. The corresponding second secure party private parameter vector is $\theta_b=(\theta_{b0}, \theta_{b1}, \theta_{b2}, \ldots, \theta_{bn}) \in R^+$, and the second secure party private input vector is $X_b=(1, b, b^3, \ldots, b^{2n-1})$.

(33) Execute the secure two-party dot product protocol (S2PDP) on the first secure party private input vector $X_a \in R^{n+1}$ and the second secure party private parameter vector $\theta_b \in R^{n+1}$ and calculate $f_{S2PDP}(X_a,\theta_b)=\theta_b \odot X_a$ to obtain a first dot product sub-result $V_{a1} \in R$ and a second dot product sub-result $V_{b1} \in R$, which are then sent to the first secure party node Alice and the second secure party node Bob, respectively. It should be noted that at this point, the following formula is satisfied: $f_{S2PDP}(X_a,\theta_b)=V_{a1}+V_{b1}=\theta_b \odot X_a$.

(34) Send the second dot product sub-result $V_{b1} \in R$ from the second secure party node Bob to the first secure party node Alice; at the first secure party node Alice, perform dot product calculation between the first secure party private parameter vector $\theta_a$ and the first secure party private input vector $X_a$ to obtain a first vector dot product result, with a specific calculation formula as follows: $T_a=\theta_a \odot X_a$; then, at the first secure party node Alice, determine a first secure party mapping result $U_a$ based on the first vector dot product result $T_a$, the first dot product sub-result $V_{a1}$, and the second dot product sub-result $V_{b1}$, with a specific calculation formula as follows: $U_a=(T_a+V_{a1})+V_{b1}$.

(35) Execute the secure two-party dot product protocol on the second secure party private input vector $X_b \in R^{n+1}$ and the first secure party private parameter vector $\theta_a \in R^{n+1}$ and calculate $f_{S2PDP}(X_b,\theta_a)=\theta_a \odot X_b$ to obtain a third dot product sub-result $V_{a2} \in R$ and a fourth dot product sub-result $V_{b2} \in R$, which are then sent to the first secure party node Alice and the second secure party node Bob, respectively. It should be noted that at this point, the following formula is satisfied: $f_{S2PDP}(X_b,\theta_a)=V_{a2}+V_{b2}=\theta_a \odot X_b$.

(36) Send the third dot product sub-result $V_{a2} \in R$ from the first secure party node Alice to the second secure party node Bob; at the second secure party node Bob, perform dot product calculation between the second secure party private parameter vector $\theta_b$ and the second secure party private input vector $X_b$ to obtain a second vector dot product result $T_b$, with a specific calculation formula as follows: $T_b=\theta_b \odot X_b$; then, at the second secure party node, determine a second secure party mapping result $U_b$ based on the second vector dot product result $T_b$, the third dot product sub-result $V_{a2}$, and the fourth dot product sub-result $V_{b2}$, with a specific calculation formula as follows: $U_b=(T_b+V_{b2})+V_{a2}$.

In practical applications, if only the secure two-party dot product protocol is executed, the final private mapping function values $U_a$ and $U_b$ can be sent to the computing requester. The computing requester aggregates the received values and performs verification: For participant node Alice: $U_a=(T_a+V_{a1})+V_{b1}=(\theta_a \odot X_a+V_{a1})+V_{b1}=\theta_a \odot X_a+\theta_b \odot X_a=(\theta_a+\theta_b) \odot X_a=\Pi(\theta,X_a) \hookleftarrow \mathcal{F}(a,\theta)$; similarly, for participant node Bob: $U_b=V_{a2}+(T_b+V_{b2})=V_{a2}+(\theta_b \odot X_b+V_{b2})=\theta_a \odot X_b+\theta_b \odot X_b=(\theta_a+\theta_b) \odot X_b=\Pi(\theta,X_b) \hookleftarrow \mathcal{F}(b,\theta)$.

(4) Secure Two-Party Real Number Comparison Protocol

Figure 7:
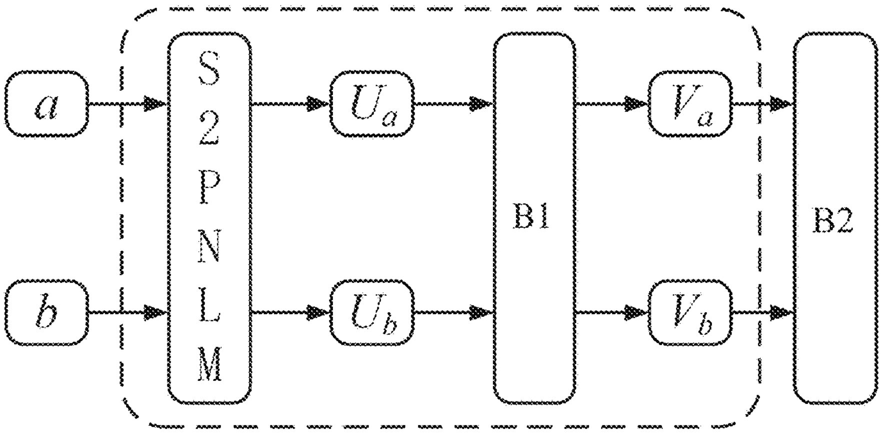
FIG. 7 is a flowchart of a secure two-party numerical comparison protocol according to an embodiment of the present disclosure; where B1 represents sign conversion module and B2 represents computing requester.

The secure two-party real number comparison problem typically arises in applications such as privacy-preserving intersection in distributed databases, online decision tree privacy sorting, and privacy-protecting deep neural networks, and has significant research value. Therefore, to maintain generality, the initial input of the computing participant node Alice is set to be a real number $a \in R$, and the initial input of the computing participant node Bob is set to be the real number $b \in R$. Based on this, as shown in FIG. 7, the process of the secure two-party real number comparison protocol in the present disclosure includes:

(41) Obtain the first secure party node Alice and the corresponding first secure party real number a, as well as the second secure party node Bob and the corresponding second secure party real number b.

(42) Based on the first secure party node Alice and the second secure party node Bob, execute the secure two-party nonlinear mapping (S2PNLM) protocol on the first secure party real number a and the second secure party real number b to obtain a first secure party mapping result $U_a=\mathcal{F}(X_a)$ and a second secure party mapping result $U_b=\mathcal{F}(X_b)$. The mapping processes $x_a \mapsto U_a$ and $x_b \mapsto U_b$ within the protocol are independent and unrelated. Therefore, the mapping processes can be executed in parallel to improve computational efficiency.

(43) Send the first secure party mapping result $U_a=\mathcal{F}(x_a)$ from the first secure party node Alice to the second secure party node Bob, and then perform sign conversion at the second secure party node Bob based on the second secure party mapping result $U_b=\mathcal{F}(x_b)$ to obtain the second secure party computation result $V_b$.

In a specific practical application, the process of determining the second secure party computation result $V_b$ includes:

(431) Obtain a sign conversion function Sign(x) at the second secure party node, defined as:

$$\mathrm{Sign}(x)=\begin{cases}-1, & x<0\\ 0, & x=0\\ 1, & x>0\end{cases}.$$

x represents the difference between the first secure party mapping result and the second secure party mapping result. In FIG. 7, the sign conversion module includes the sign conversion function.

(432) Use a difference between the first secure party mapping result and the second secure party mapping result as an input to the sign conversion function to obtain the second secure party computation result $V_b$, where a specific formula is as follows: $V_b=\mathrm{Sign}(\sigma)=\delta \in \{-1,0,1\}$; $\sigma=U_a-U_b$ serves as an input to a sign function Sign(x).

Since the nonlinear mapping function is a monotonically increasing function in the real number domain, the computing requester can easily infer the relative size relationship between the private data a from Alice and the private data b from Bob based on the sign of the final comparison function output $\delta$. Specifically, $$\delta=\begin{cases}-1, & a<b\\ 0, & a=b\\ 1, & a>b\end{cases}.$$

(44) Send the second secure party mapping result $U_b=\mathcal{F}(x_b)$ from the second secure party node Bob to the first secure party node Alice, and then perform sign conversion at the first secure party node Alice based on the first secure party mapping result $U_a=\mathcal{F}(x_a)$ to obtain the first secure party computation result $V_a$.

In another specific practical application, step 103 includes:

(51) Obtain the computing requester corresponding to the real number comparison request.

(52) Send both the first secure party computation result $V_a$ and the second secure party computation result $V_b$ to the computing requester.

(53) The computing requester performs a consistency comparison on the received first secure party computation result $V_a$ and second secure party computation result $V_b$ (the consistency comparison ensures the reliability of the comparison result, because if the first secure party node Alice and the second secure party node Bob compute accurately and do not lie, $V_a=V_b$ will always hold; if $V_a \neq V_b$, at least one party has made an error in computation); after the consistency comparison, the computing requester determines the real number comparison result based on the first secure party computation result $V_a$ or the second secure party computation result $V_b$, where the real number comparison result characterizes a relative size relationship between the first secure party real number and the second secure party real number.

Specifically, when the results are reliable, the relative size relationship between the private data a from node Alice and the private data b from node Bob can be quickly inferred based on the sign of either the first secure party computation result $V_a$ or the second secure party computation result $V_b$. Specifically, when $V_a=V_b=-1$, a<b; when $V_a=V_b=0$, a=b; when $V_a=V_b=1$, a>b.

Figure 8:
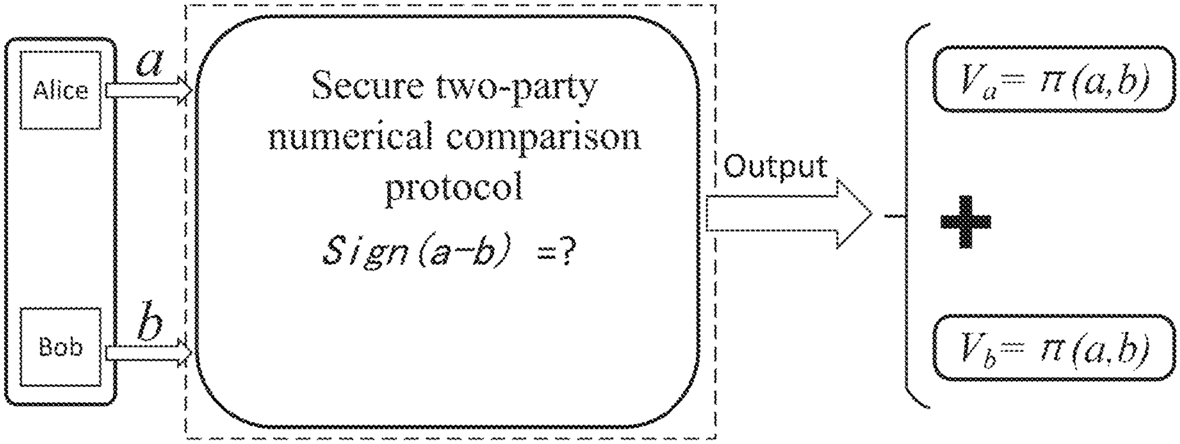
FIG. 8 is a schematic diagram of a secure two-party numerical comparison problem according to an embodiment of the present disclosure.

Furthermore, from an overall perspective, the present disclosure addresses the problem of secure two-party real number comparison, which can be illustrated in FIG. 8: Given two computing participants Alice and Bob, who are independent and mutually distrustful, Alice holds private data $a \in R$ stored only at her computing node, and Bob holds private data b E R stored only at his computing node. The two participants jointly execute a secure two-party real number comparison protocol $\pi(a,b)=\text{sign}(a-b)=V_a=V_b$. Eventually, the two computing participant nodes obtain their corresponding output indicators $V_a$, $V_b \in \{1,0,-1\}$, respectively, and send the output indicators to the computing requester to obtain the desired result of the two-party numerical comparison. During the computation process, each participant node can only access input/output information related to its own computation process, and cannot access any intermediate computation results or private data information held by the other participant.

For the above secure two-party real number comparison problem, the present disclosure provides a secure two-party vector dot product (S2PDP) protocol based on the secure data disguising technology. This protocol features lightweight design, low overheads, and high computational efficiency, addressing the issues of high communication overheads, high computational complexity, and low usability caused by the mixed invocation of existing cryptographic solutions such as homomorphic encryption, secret sharing, oblivious transfer, and garbled circuits. The present disclosure also introduces a privacy protection solution for the two-party collaborative computation of nonlinear mapping problems for the first time, with the key technical point being the introduction of a family of monotonically increasing functions jointly constructed by both parties, whose order-preserving property is crucial for ensuring the correctness and security of the final comparison result. By performing sign conversion on the intermediate results of the dual mapping protocol, the present disclosure guarantees the reliability and fairness of the final output result, addressing the reliability and fairness issues caused by one party knowing the result first in traditional solutions.

In practical applications, to improve computational efficiency, in the secure two-party real number comparison method based on nonlinear mapping of the present disclosure, computational operations required to be executed by the first secure party node and computational operations required to be executed by the second secure party node are performed asynchronously in parallel.

Based on the same inventive concept, an embodiment of the present disclosure further provides a secure two-party real number comparison apparatus for implementing the aforementioned secure two-party real number comparison method based on nonlinear mapping. The implementation solution provided by the apparatus for solving the problem is similar to the implementation solution described in the above method. Therefore, for the specific limitations of one or more embodiments of the secure two-party real number comparison apparatus based on nonlinear mapping provided below, reference can be made to the limitations of the secure two-party real number comparison method based on nonlinear mapping described above, and details are not described herein again.

Figure 9:
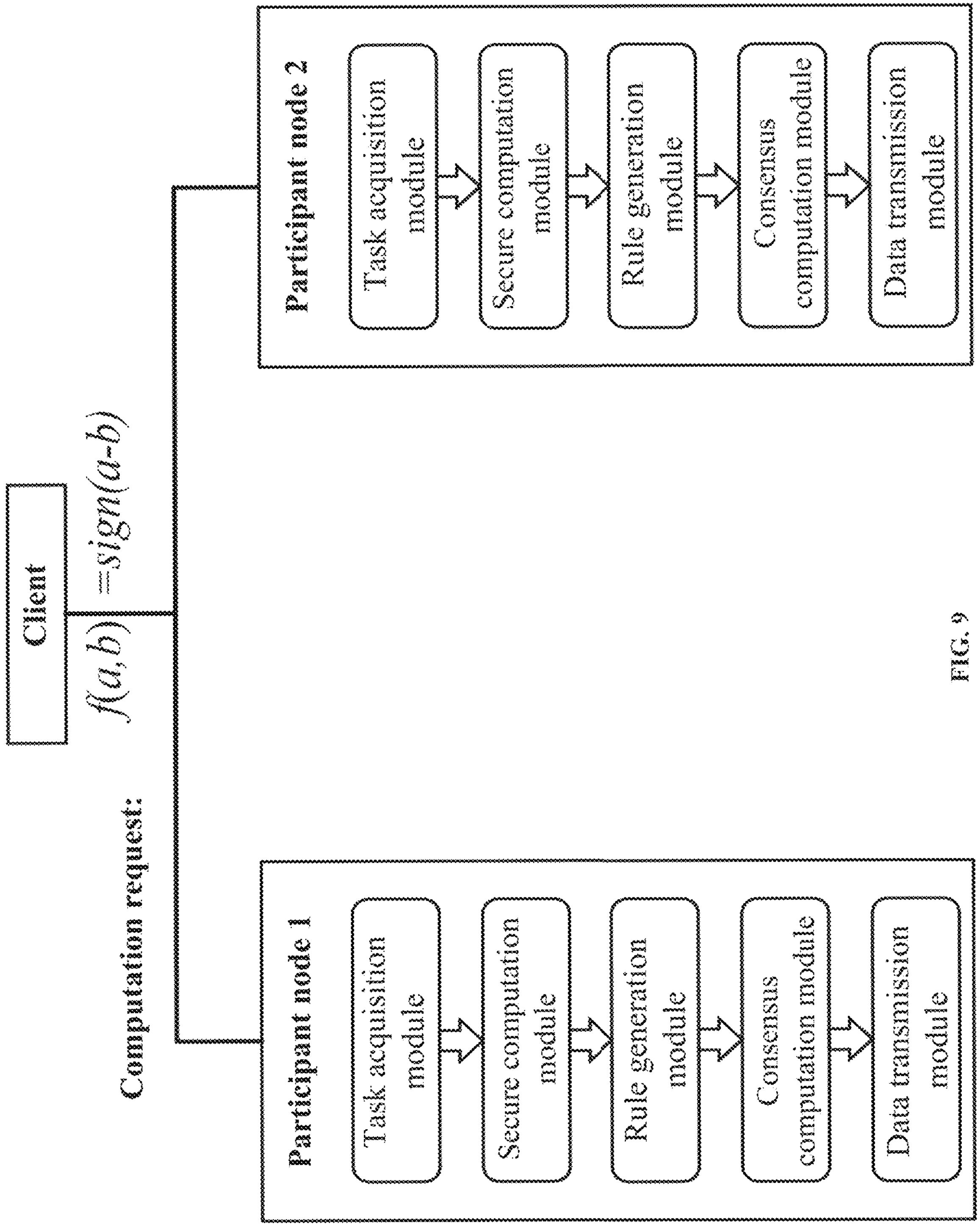
FIG. 9 is a schematic diagram of a secure two-party real number comparison apparatus based on nonlinear mapping according to an embodiment of the present disclosure.

In an exemplary embodiment, as shown in FIG. 9, a secure two-party real number comparison apparatus based on nonlinear mapping is provided, which includes a task acquisition module, a secure computation module, a rule generation module, a consensus computation module, and a data transmission module.

The task acquisition module is configured to analyze and obtain secure two-party real number comparison request information sent by a computing requester (such as a client), where the secure two-party real number comparison request information includes a real number comparison request, a first secure party node and a corresponding first secure party real number, as well as a second secure party node and a corresponding second secure party real number.

The secure computation module is configured to match a corresponding secure two-party real number comparison protocol based on the real number comparison request.

The comparison computation module is configured to execute the secure two-party real number comparison protocol on the first secure party real number and the second secure party real number based on the first secure party node and the second secure party node to obtain a first secure party computation result and a second secure party computation result. In a specific application instance, the comparison computation module includes a rule generation module and a consensus computation module that communicate with each other.

The rule generation module is configured to: determine, based on the secure two-party real number comparison protocol, computational operations that the first secure party node needs to execute and computational operations that the second secure party node needs to execute (that is, achieving computational task decomposition so that different computing nodes perform collaborative computation according to respective rules), and construct an asynchronous parallel execution process; determine computational operation instructions for both nodes based on the asynchronous parallel execution process and send the computational operation instructions to the first secure party node and the second secure party node, respectively, until the asynchronous parallel execution process ends, resulting in the first secure party computation result and the second secure party computation result.

The consensus computation module is configured to: monitor the computational operations in the first secure party node and the computational operations in the second secure party node, and match the computational operations with the asynchronous parallel execution process to ensure a sequence of secure two-party real number comparisons, thereby ensuring the synchronization of computations and the consistency of results between different nodes.

The data transmission module is configured to return the first secure party computation result and the second secure party computation result to the computing requester, and determine, at the computing requester, a real number comparison result between the first secure party real number and the second secure party real number based on the first secure party computation result and the second secure party computation result.

The secure two-party real number comparison protocol is determined based on a secure two-party nonlinear mapping protocol and sign conversion processing; the secure two-party nonlinear mapping protocol is determined based on vector space mapping transformation and a secure two-party dot product protocol; and the secure two-party dot product protocol is determined based on random vectors, random numbers, an auxiliary computing node, and a secure data disguising technology.

In a specific practical application, using the secure two-party real number comparison apparatus based on nonlinear mapping provided by the present disclosure, a computational framework is deployed, and a secure two-party numerical comparison task is carried out as follows: via HTTP or gRPC communication protocols, a client outside the framework sends a request for two-party numerical comparison to network terminals deployed with distributed computing services. Upon receiving the request for numerical comparison, task acquisition modules of nodes on the network parse the request, and secure computation service processes of corresponding computing participant nodes, Alice and Bob, are initiated. Once the task acquisition modules have parsed the corresponding computational requirements, the computational requirements are sent to secure computation modules, which perform a joint query through internal interfaces, matching a corresponding secure computation protocol (which can be any of the secure two-party dot product protocol, secure two-party nonlinear mapping protocol, or secure two-party real number comparison protocol) and synchronizing the protocol to rule generation modules of both participant nodes. The rule generation modules formulate different asynchronous parallel execution processes based on the different sub-tasks assigned to the two different participant nodes, and maintain communication with consensus computation modules at each step of execution. The consensus computation modules broadcast and maintain consistency of results of the distributed computation nodes on chain and controls stability of the execution flow while the two participant nodes execute each computation instruction. After the execution of the computation protocol is complete and the two participant nodes, Alice and Bob, obtain computation results from each other, resulting sub-matrices obtained after two-party obfuscation and splitting are sent to the commutating requester through data transmission modules, thereby obtaining a correct computation result.

In specific practical application scenarios, depending on the actual context of the computation request issued by the client, there are two cases: First, the computation request is for intermediate computation needs, where the obtained real number comparison result can serve as an input for the next round of computation, for example, in the maximum pooling layer during the training phase of deep neural network models or in the multi-level decision process of decision tree models; second, the computation request is a standalone computation request, where the obtained real number comparison result can be directly returned to the computing requester, for example, in simple size comparisons required in computational programs.

In summary, compared to the prior art, the present disclosure has the following advantages:

(1) The present disclosure proposes a secure two-party vector dot product protocol (S2PDP) based on the secure data disguising technology under a semi-honest scenario. This protocol reduces the computational complexity to O(n) level compared to existing homomorphic encryption, secret sharing, and garbled circuit solutions, while the constant number of interaction rounds and the intermediate transmitted data are all real numbers, ensuring that communication overhead costs are kept within a low range, balancing the three seemingly impossible demands of security, lightweight design, and efficiency.

(2) The present disclosure presents a numerical comparison method based on the secure two-party nonlinear mapping protocol (S2PNLM). The two parties jointly hold a portion of parameters, which ensures computational security. It introduces a set of power functions to construct a family of nonlinear mapping functions, utilizing the monotonically increasing property to ensure the consistency of relative sizes between outputs and inputs. The original inputs are transformed into disguised data in the nonlinear function space for comparison, and the parallel invocation of S2PDP directly enhances the computational timeliness of this dual numerical mapping, thereby avoiding the efficiency issues caused by the additional computational overheads of traditional methods that rely on numerical difference calculations for comparison.

(3) The present disclosure does not directly output the results of the S2PNLM protocol; instead, it uses a sign conversion module to transform intermediate computation results that may carry original data features into symbolic elements $\mathrm{Sign}(x)=\{-1,0,1\}$ that only represent the relative size relationship between the data of the two parties. This approach not only ensures that the ultimate computing requester cannot obtain any privacy related to the input through the output but also ensures the reliability of the output through the consistency of both parties. Notably, when the computing requester consists of Alice and Bob, both parties can simultaneously obtain the final comparison result, addressing the fairness issue in outputs present in traditional methods.

(4) The present disclosure is a key technology research for an integrated blockchain performance model and multi-level continuous collaborative optimization.

In another exemplary embodiment, a computer device is provided, including a memory and a processor, where the memory stores a computer program, and the computer program is executed by the processor to implement the steps of the above method embodiment.

In another exemplary embodiment, a computer-readable storage medium is provided. The computer-readable storage medium stores a computer program, and the computer program is executed by a processor to implement the steps of the above method embodiment.

In an exemplary embodiment, a computer program product is provided. The computer program product includes a computer program, and the computer program is executed by a processor to implement the steps of the above method embodiment.

It is to be noted that information of a user (including but not limited to device information of the user, personal information of the user and the like) and data (including but not limited to data for analysis, data for storage, data for exhibition and the like) in the present disclosure are information and data authorized by the user or fully authorized by each party, and relevant data shall be acquired, used and processed according to related regulations.

Those of ordinary skill in the art may understand that all or some of the procedures in the method of the foregoing embodiments may be implemented by a computer program instructing related hardware. The computer program may be stored in a nonvolatile computer-readable storage medium. When the computer program is executed, the procedures in the embodiments of the foregoing method may be performed. Any reference to a memory, a storage, a database, or other media used in the embodiments of the present disclosure may include a non-volatile and/or volatile memory. The non-volatile memory may include a read-only memory (ROM), a magnetic tape, a floppy disk, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM) or an external cache memory. As an illustration rather than a limitation, the RAM may be in various forms, such as a static random access memory (SRAM) or a dynamic random access memory (DRAM).

The database in the embodiments of the present disclosure may include at least one of a relational database and a non-relational database. The non-relational database may include a distributed database based on a blockchain, but is not limited thereto. The processor in the embodiments of the present disclosure may be a general-purpose processor, a central processor, a graphics processor, a digital signal processor (DSP), a programmable logic device, and a data processing logic device based on quantum computing, but is not limited thereto.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A secure two-party real number comparison method based on nonlinear mapping, comprising:

obtaining secure two-party real number comparison request information, wherein the secure two-party real number comparison request information comprises a real number comparison request, a first secure party node and a corresponding first secure party real number, as well as a second secure party node and a corresponding second secure party real number;

generating a first secure party private parameter vector at the first secure party node and performing vector space mapping transformation based on the first secure party real number to generate a first secure party private input vector; generating a second secure party private parameter vector at the second secure party node and performing vector space mapping transformation based on the second secure party real number to generate a second secure party private input vector;

executing a secure two-party dot product protocol on the first secure party private input vector and the second secure party private parameter vector, to obtain a first dot product sub-result and a second dot product sub-result, which are then sent to the first secure party node and the second secure party node, respectively;

sending the second dot product sub-result from the second secure party node to the first secure party node; at the first secure party node, performing dot product calculation between the first secure party private parameter vector and the first secure party private input vector to obtain a first vector dot product result; and then, at the first secure party node, determining a first secure party mapping result based on the first vector dot product result, the first dot product sub-result, and the second dot product sub-result;

executing the secure two-party dot product protocol on the second secure party private input vector and the first secure party private parameter vector, to obtain a third dot product sub-result and a fourth dot product sub-result, which are then sent to the first secure party node and the second secure party node, respectively;

sending the third dot product sub-result from the first secure party node to the second secure party node: at the second secure party node, performing dot product calculation between the second secure party private parameter vector and the second secure party private input vector to obtain a second vector dot product result; and then, at the second secure party node, determining a second secure party mapping result based on the second vector dot product result, the third dot product sub-result, and the fourth dot product sub-result;

sending the first secure party mapping result from the first secure party node to the second secure party node, and performing sign conversion at the second secure party node based on the second secure party mapping result to obtain a second secure party computation result;

sending the second secure party mapping result from the second secure party node to the first secure party node, and performing sign conversion at the first secure party node based on the first secure party mapping result to obtain a first secure party computation result;

obtaining a computing requester corresponding to the real number comparison request;

sending both the first secure party computation result and the second secure party computation result to the computing requester; and performing, by the computing requester, a consistency comparison on the received first secure party computation result and second secure party computation result; and after the consistency comparison, determining a real number comparison result based on the first secure party computation result or the second secure party computation result, wherein the real number comparison result characterizes a relative size relationship between the first secure party real number and the second secure party real number;

wherein the secure two-party dot product protocol is determined based on random vectors, random numbers, an auxiliary computing node, and a secure data disguising technology.

2. The secure two-party real number comparison method based on nonlinear mapping according to claim 1, wherein said performing sign conversion at the second secure party node based on the second secure party mapping result to obtain the second secure party computation result comprises: obtaining a sign conversion function at the second secure party node; and using a difference between the first secure party mapping result and the second secure party mapping result as an input to the sign conversion function to obtain the second secure party computation result;

wherein, the sign conversion function Sign(x) is defined as follows:

$$\mathrm{Sign}(x) = \begin{cases} -1, & x < 0 \\ 0, & x = 0 \\ 1, & x > 0 \end{cases};$$

x represents the difference between the first secure party mapping result and the second secure party mapping result.

3. The secure two-party real number comparison method based on nonlinear mapping according to claim 1, wherein said generating the first secure party private parameter vector at the first secure party node and performing vector space mapping transformation based on the first secure party real number to generate the first secure party private input vector comprises:

obtaining a random parameter n that is jointly negotiated and determined by the first secure party node and the second secure party node;

at the first secure party node, generating a set of (|n|+1)-dimensional parameter vectors based on the random parameter, which are labeled as the first secure party private parameter vector; and at the first secure party node, performing a mapping transformation from unary real numbers to an (|n|+1)-dimensional vector space based on the first secure party real number, to obtain the first secure party private input vector.

4. The secure two-party real number comparison method based on nonlinear mapping according to claim 1, wherein a process of the secure two-party dot product protocol comprises:

obtaining a first private vector generated at the first secure party node and a second private vector generated at the second secure party node, wherein when the first private vector is the first secure party private parameter vector, the corresponding second private vector is the second secure party private input vector; when the first private vector is the first secure party private input vector, the corresponding second private vector is the second secure party private parameter vector;

invoking an auxiliary computing node, and randomly generating a first random vector and a corresponding first random number, as well as a second random vector and a corresponding second random number at the auxiliary computing node, wherein a sum of the first random number and the second random number equals a dot product of the first random vector and the second random vector;

sending the first random vector and the first random number from the auxiliary computing node to the first secure party node; and sending the second random vector and the second random number from the auxiliary computing node to the second secure party node;

at the first secure party node, determining a first encrypted vector based on the first random vector and the first private vector, and then sending the first encrypted vector to the second secure party node; at the second secure party node, randomly generating a second private output, and calculating an intermediate result based on the second random number, the second private output, the first encrypted vector, and the second private vector, and then sending the intermediate result to the first secure party node;

at the second secure party node, determining a second encrypted vector based on the second random vector and the second private vector, and then sending the second encrypted vector to the first secure party node;

at the first secure party node, calculating a first private output based on the intermediate result, the second encrypted vector, the first random number, and the first random vector; and marking the second private output as the second dot product sub-result or the fourth dot product sub-result, and marking the first private output as the first dot product sub-result or the third dot product sub-result, wherein a sum of the first dot product sub-result and the second dot product equals a dot product of the first private vector and the second private vector.

5. The secure two-party real number comparison method based on nonlinear mapping according to claim 1, wherein the secure two-party real number comparison method based on nonlinear mapping further comprises: executing computational operations required to be executed by the first secure party node and computational operations required to be executed by the second secure party node asynchronously in parallel.

6. A secure two-party real number comparison apparatus based on nonlinear mapping, comprising:

a task acquisition module, configured to obtain secure two-party real number comparison request information, wherein the secure two-party real number comparison request information comprises a real number comparison request, a first secure party node and a corresponding first secure party real number, as well as a second secure party node and a corresponding second secure party real number;

a secure computation module configured to match a corresponding secure two-party real number comparison protocol based on the real number comparison request;

a comparison computation module configured to execute the secure two-party real number comparison protocol on the first secure party real number and the second secure party real number based on the first secure party node and the second secure party node to obtain a first secure party computation result and a second secure party computation result; and a data transmission module configured to return the first secure party computation result and the second secure party computation result to a computing requester, so that the computing requester, determines a real number comparison result between the first secure party real number and the second secure party real number by performing a consistency comparison on the first secure party computation result and the second secure party computation result;

wherein executing the secure two-party real number comparison protocol on the first secure party real number and the second secure party real number based on the first secure party node and the second secure party node comprises:

generating a first secure party private parameter vector at the first secure party node and performing vector space mapping transformation based on the first secure party real number to generate a first secure party private input vector; generating a second secure party private parameter vector at the second secure party node and performing vector space mapping transformation based on the second secure party real number to generate a second secure party private input vector;

executing a secure two-party dot product protocol on the first secure party private input vector and the second secure party private parameter vector, to obtain a first dot product sub-result and a second dot product sub-result, which are then sent to the first secure party node and the second secure party node, respectively;

sending the second dot product sub-result from the second secure party node to the first secure party node; at the first secure party node, performing dot product calculation between the first secure party private parameter vector and the first secure party private input vector to obtain a first vector dot product result; and then, at the first secure party node, determining a first secure party mapping result based on the first vector dot product result, the first dot product sub-result, and the second dot product sub-result;

executing the secure two-party dot product protocol on the second secure party private input vector and the first secure party private parameter vector, to obtain a third dot product sub-result and a fourth dot product sub-result, which are then sent to the first secure party node and the second secure party node, respectively;

sending the third dot product sub-result from the first secure party node to the second secure party node: at the second secure party node, performing dot product calculation between the second secure party private parameter vector and the second secure party private input vector to obtain a second vector dot product result; and then, at the second secure party node, determining a second secure party mapping result based on the second vector dot product result, the third dot product sub-result, and the fourth dot product sub-result;

sending the first secure party mapping result from the first secure party node to the second secure party node, and performing sign conversion at the second secure party node based on the second secure party mapping result to obtain the second secure party computation result; and sending the second secure party mapping result from the second secure party node to the first secure party node, and performing sign conversion at the first secure party node based on the first secure party mapping result to obtain the first secure party computation result;

wherein the secure two-party real number comparison protocol is determined based on a secure two-party nonlinear mapping protocol and sign conversion processing; the secure two-party nonlinear mapping protocol is determined based on vector space mapping transformation and the secure two-party dot product protocol; and the secure two-party dot product protocol is determined based on random vectors, random numbers, an auxiliary computing node, and a secure data disguising technology.

7. The secure two-party real number comparison apparatus based on nonlinear mapping according to claim 6, wherein the comparison computation module comprises a rule generation module and a consensus computation module that communicate with each other;

the rule generation module is configured to: determine, based on the secure two-party real number comparison protocol, computational operations that the first secure party node requires to execute and computational operations that the second secure party node requires to execute, and construct an asynchronous parallel execution process; determine computational operation instructions for both nodes based on the asynchronous parallel execution process and send the computational operation instructions to the first secure party node and the second secure party node, respectively, until the asynchronous parallel execution process ends, resulting in the first secure party computation result and the second secure party computation result; and the consensus computation module is configured to: monitor the computational operations in the first secure party node and the computational operations in the second secure party node, and match the computational operations with the asynchronous parallel execution process to ensure a sequence of secure two-party real number comparisons.

* * * * *